UNITED STATES PATENT OFFICE.

CLARK ALVORD, OF SYRACUSE, NEW YORK.

COFFEE SUBSTITUTE AND PROCESS OF PREPARING THE SAME.

SPECIFICATION forming part of Letters Patent No. 295,968, dated April 1, 1884.

Application filed July 26, 1883. (Specimens.)

*To all whom it may concern:*

Be it known that I, CLARK ALVORD, a citizen of the United States, residing at Syracuse, in the county of Onondaga and State of New York, have invented a new and useful Compound or Composition of Matter to be Used as a Substitute for Coffee, of which the following is a specification.

My compound consists of the extract of willow or tulip-tree bark (the willow is preferable) combined with corn, barley, wheat, rye, peas, or other amylaceous substances.

My process in forming this compound is as follows: I boil the bark in water until the extract is as bitter as I desire, (which I determine by tasting it.) I then remove the bark and put into the extract either corn, barley, wheat, rye, peas, or some other amylaceous substance, in such quantity as the extract will saturate throughout. I then boil the substance so treated until it is well cooked. I then remove and dry the same, and roast it in a coffee-roaster until it is brown as roasted coffee. I then grind it, when it is ready for use. The strength of the compound is determined by the strength of the extract. I prefer corn or barley for making the compound.

What I claim, and desire to secure by Letters Patent of the United States, is—

1. The dry roasted mixture composed of the extract of willow-bark or tulip-tree bark with corn, barley, wheat, rye, peas, or other amylaceous substance, as above set forth.

2. The process used for effecting such combination—viz., producing the extract by boiling the bark in water, and then saturating the corn, barley, wheat, rye, peas, or other amylaceous substance by boiling them in such extract until they are well cooked, then removing and drying the same and roasting it in a coffee-roaster until it is brown as roasted coffee, as above set forth.

CLARK ALVORD.

Witnesses:
PATRICK SULLIVAN,
D. M. SULLIVAN.